United States Patent [19]

Hagerty

[11] Patent Number: 4,611,519

[45] Date of Patent: Sep. 16, 1986

[54] RADIUS CORNER FORMING APPARATUS AND METHOD

[76] Inventor: Lloyd A. Hagerty, 10315 Parr Ave., Sunland, Calif. 91040

[21] Appl. No.: 650,235

[22] Filed: Sep. 13, 1984

[51] Int. Cl.⁴ ............................................... B26F 1/14
[52] U.S. Cl. ..................................... 83/389; 83/467 R; 83/143; 83/553; 83/567; 83/692; 83/917
[58] Field of Search ................... 83/467, 467 A, 468, 83/143, 567, 692, 553, 589, 917, 560, 389, 388

[56] References Cited

U.S. PATENT DOCUMENTS

| | | | |
|---|---|---|---|
| 1,320,206 | 10/1919 | Cohen | 83/143 |
| 2,323,431 | 7/1943 | Wales | 83/567 X |
| 2,654,428 | 10/1953 | Martincic | 83/696 X |
| 2,656,888 | 10/1953 | Cruzan | 83/467 X |
| 3,357,289 | 12/1967 | Thomson | 83/389 |

Primary Examiner—Donald R. Schran
Attorney, Agent, or Firm—Robert J. Schaap

[57] ABSTRACT

A radius corner forming apparatus and method and which utilizes a plate to receive a metal sheet in which a corner portion is to be removed to form a radius corner. A die block and punch set is removably attachable to a conventional punch press in order to sever the corner portion of the sheet to produce the radius corner thereon. The plate which receives the metal sheet is resiliently mounted to oppose the pressure of the punch when shifted. A plurality of differently sized radius corner die blocks and co-operating punches are provided.

17 Claims, 17 Drawing Figures

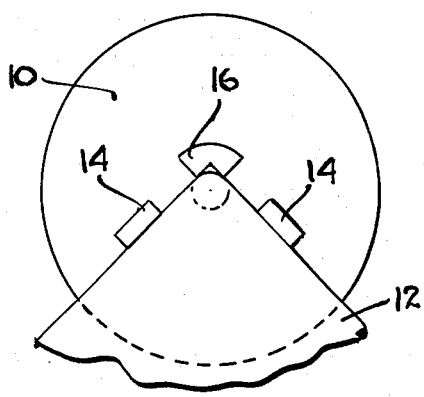
FIG. 1
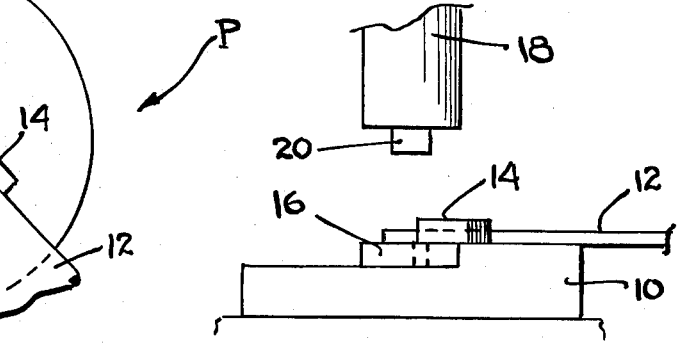
PRIOR ART    FIG. 2
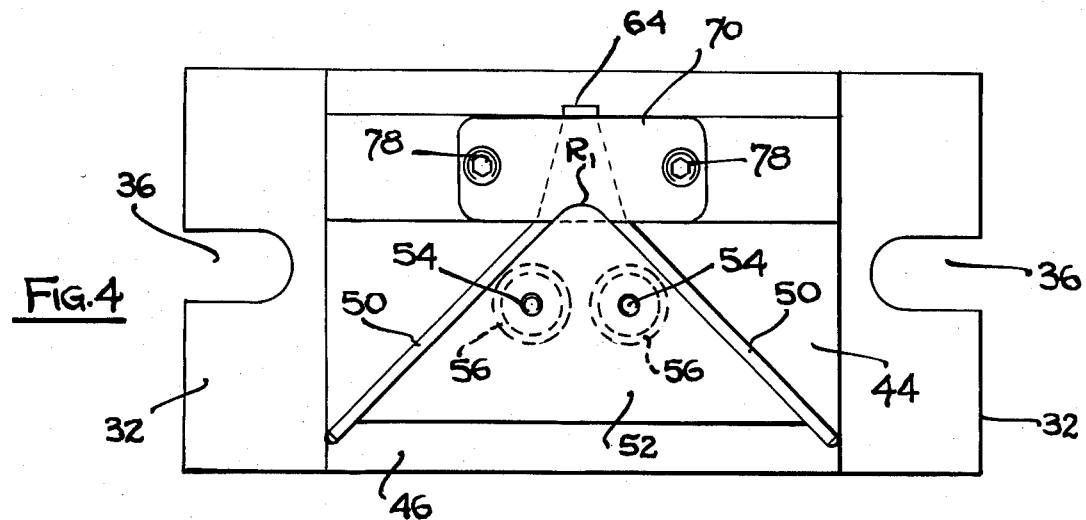
FIG. 4
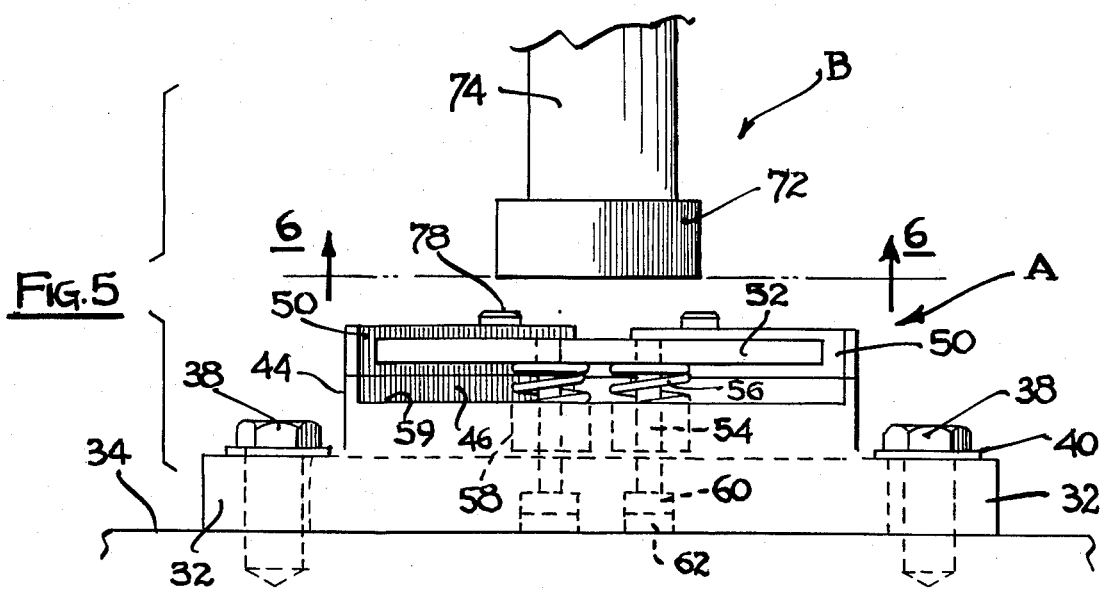
FIG. 5

RADIUS CORNER FORMING APPARATUS AND METHOD

BACKGROUND OF THE INVENTION

1. Field of the Invention

This invention relates in general to certain new and useful improvements in an apparatus and method for producing a radius corner of a metal sheet and more particularly, to an apparatus and method of the type stated which utilizes any one of a plurality of selectable die blocks and associated punches with a plate for resiliently supporting the metal sheet.

2. Brief Description of the Prior Art

The apparatus for producing a radius corner i.e. a rounded corner at two intersecting edges of a metal sheet are well known. Generally, in sheet metal operations, it is desirable to remove the sharp right angle corner at each of the four corners of a rectangularly shaped sheet. The standard practice is to use a so-called "radius punch press". This punch press is designed to have a punch with an arcuate corner portion to engage the sheet and sever the corner portion of the sheet. However, the punch on this punch press is fixed and thus, only one particular radius can be achieved at each sheet corner.

The conventional punch presses are usually rather large machines which are not readily moveable. Thus, these machines are adapted for permanent disposition in a particular location. Some of these punch press machines are mechanically operable and use a large diameter flywheel driver by an electric motor. A clutch is interposed between the motor and flywheel and engages the flywheel on actuation of a foot pedal. Other forms of conventional punch presses are hydraulically operated. Moreover, due to the fact that these conventional presses are hydraulically operated or mechanically operated and must be capable of stamping sheets of varying thickness, they are necessarily bulky and heavy in construction and are also quite expensive. As a result, it is difficult for the average sheet metal shop to afford the cost of more than one or two of these machines. Therefore, the average machine shop is limited as to the number of different radius corners which can be produced on metal sheets.

OBJECTS OF THE INVENTION

It is, therefore, a primary object of the present invention to provide an apparatus for producing radius corners in a metal sheet and which utilizes a plurality of die blocks and co-operating punches which are releasably mounted to a conventional punch press.

It is another object of the present invention to provide an apparatus of the type stated in which a radius corner is formed in a sheet by a punch capable of engaging a sheet mounted on a resiliently supported plate.

It is a further object of the present invention to provide an apparatus of the type stated in which a large number of different radius corners can be formed on different metal sheets.

It is an additional object of the present invention to provide an apparatus of the type stated which is available in the for of a kit so that different die block and punch arrangements can be adapted for removable attachment to a punch press.

It is still another object of the present invention to provide an apparatus of the type stated which is relatively inexpensive to construct and which is highly practical for use in machine shops of various sizes.

It is still a further object of the present invention to provide a method of producing radius corners in metal sheets by selection of the proper combination of die block and punch arrangements for mounting on a conventional punch press and stamping the corner portions thereof.

With the above and other objects in view, my invention resides in the novel features of form, construction, arrangement and combination of parts presently described and pointed out in the claims.

BRIEF SUMMARY OF THE DISCLOSURE

The present invention provides both an apparatus and method for producing a radius corner in a metal sheet and like sheet material. The apparatus and method both rely upon a combination of a die block and a punch which are co-operable to produce a radius of the desired corner in the metal or like material sheet.

The apparatus generally comprises a plate having a relatively flat surface which is adapted to receive the sheet materially from which a corner portion is to be severed to thereby form a radius or rounded corner. A selected die block is co-operable with the corner portion of the plate and has a radius corner area substantially equivalent to the radius corner to be formed on the sheet and which is adapted to aid in the formation of the radius corner on the sheet. The die block has an upper surface which is to receive a corner portion of the sheet to be severed from the sheet.

The apparatus also includes a punch which is adapted to be attached to the lower end of a shiftable punch press and particularly the vertically shiftable shank, often referred to as a "ram", of that punch press. The punch also has a corner portion corresponding to the corner portion of the die block. In this way, the corner portion of the punch will engage the sheet at the radius corner area of the die block and sever the portion of the sheet when the ram is pushed downwardly thereby producing a radius corner on the sheet.

Means is provided to resiliently support the plate and thereby oppose the pressure of the ram and the punch when shifted. This means is connected to the plate to resist movement of the shank and the plate and captures and holds the sheet to prevent lateral movement of the sheet during the severing operation.

The means which resiliently opposes the pressure of the shank and the punch is a biasing means such as a plurality of compression springs which biases the plate upwardly against the downward movement of the punch and the shank.

The die block is provided with some fastener means or retainer means for holding the die block onto the apparatus. In like manner, the punch is similarly provided with fastener means for releasably securing the punch to the ram of the punch press.

In a more preferred embodiment of the invention, a plurality of individual punches are adapted to be attached to the shiftable member, such as the shank of a punch press assembly. Each of the punches have an arcuate corner portion with a radius different from each of the other punches. In like manner, the apparatus comprises a plurality of die blocks co-operable with the punches so that each of the die blocks can be located with respect to the punch shank to enable cutting of a corner portion of the sheet to thereby form a radius corner thereon. Each of the die blocks has an arcuate corner portion of a radius which is different from each of the other die blocks. Further, each die block also has an arcuate corner portion of a radius conforming to and essentially equal to that of a respective one of the punches.

In a more preferred embodiment, each of the die blocks is provided with a plurality of arcuate corner portions and with each having a different radius than any other corner portion. In like manner, each punch is provided with a plurality of arcuate corner portions and with each having a different radius than any other corner portion.

This invention possesses many other advantages and has other purposes which may be made more clearly apparent from consideration of the forms in which it may be embodied. These forms are shown in the drawings forming and accompanying part of the present specification. They will now be described in detail for purposes of illustrating the general principals of the invention, but it is to be understood that such detailed descriptions are not to be taken in a limiting sense.

BRIEF DESCRIPTION OF THE DRAWINGS

Figure 3:
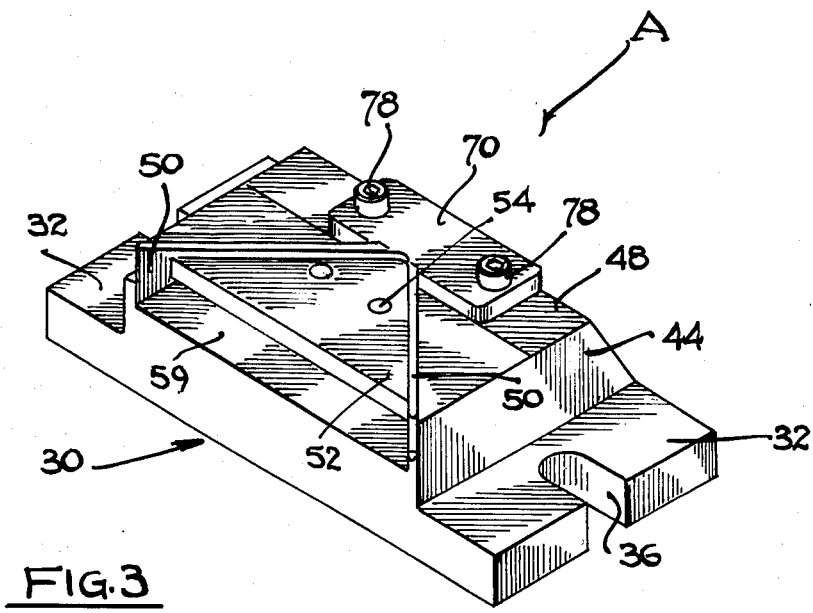
Figure 7:
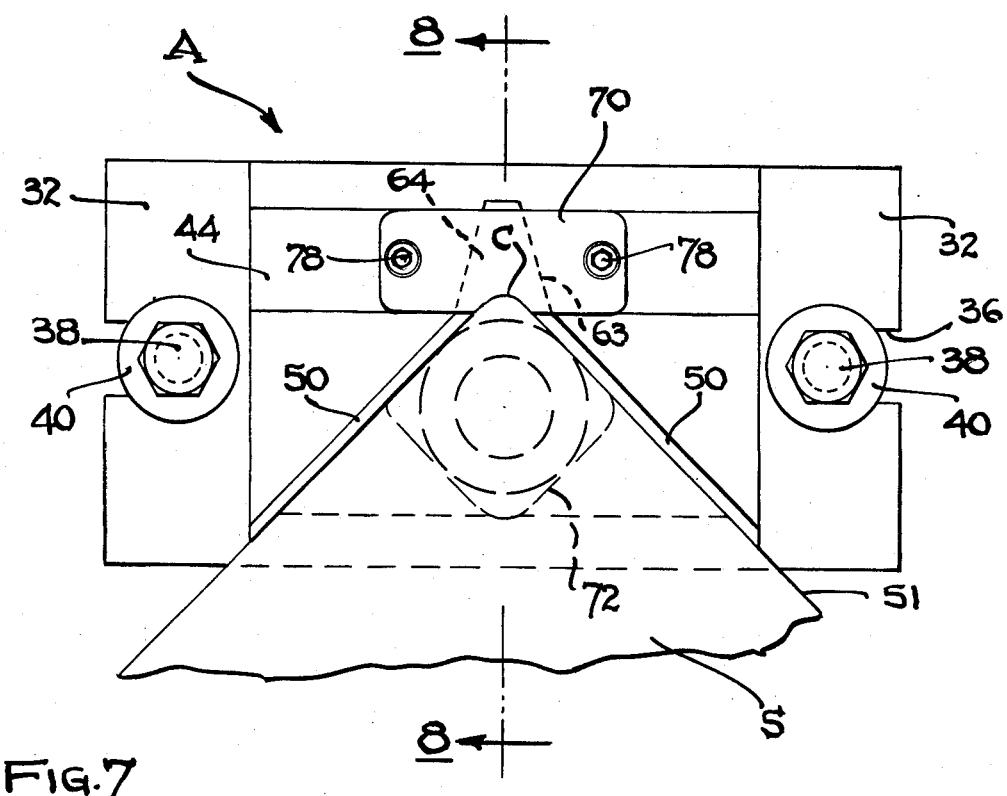
Figure 6:
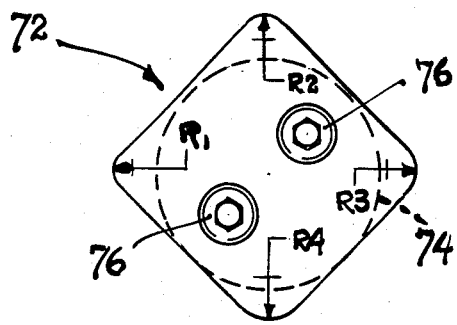
Figure 9:
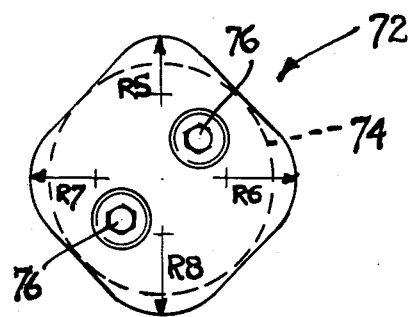
Figure 10:
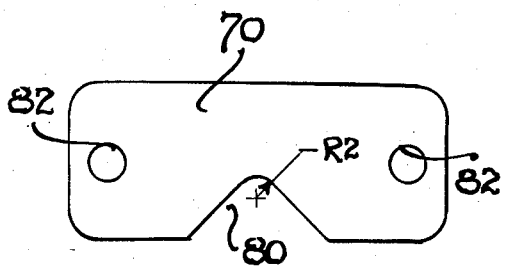
Figure 11:
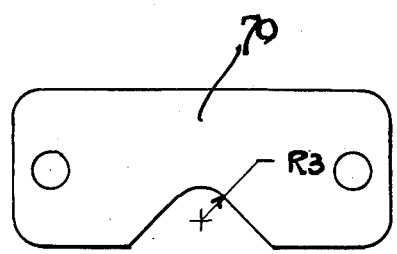
Figure 12:
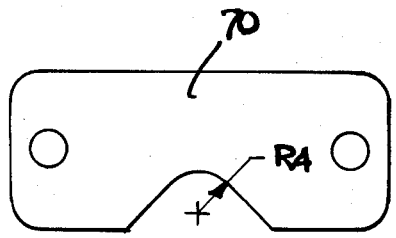
Figure 13:
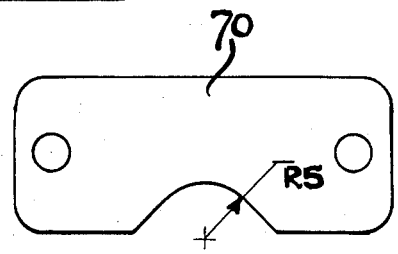
Figure 14:
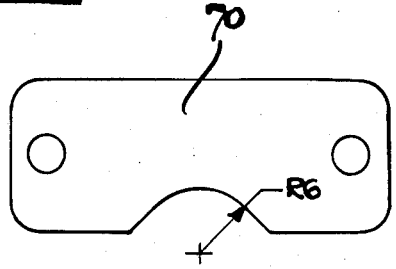
Figure 15:
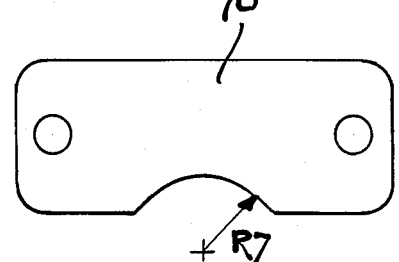
Figure 16:
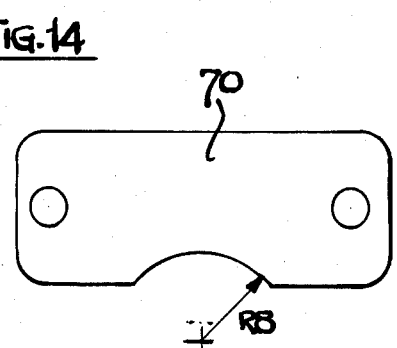
Figure 17:
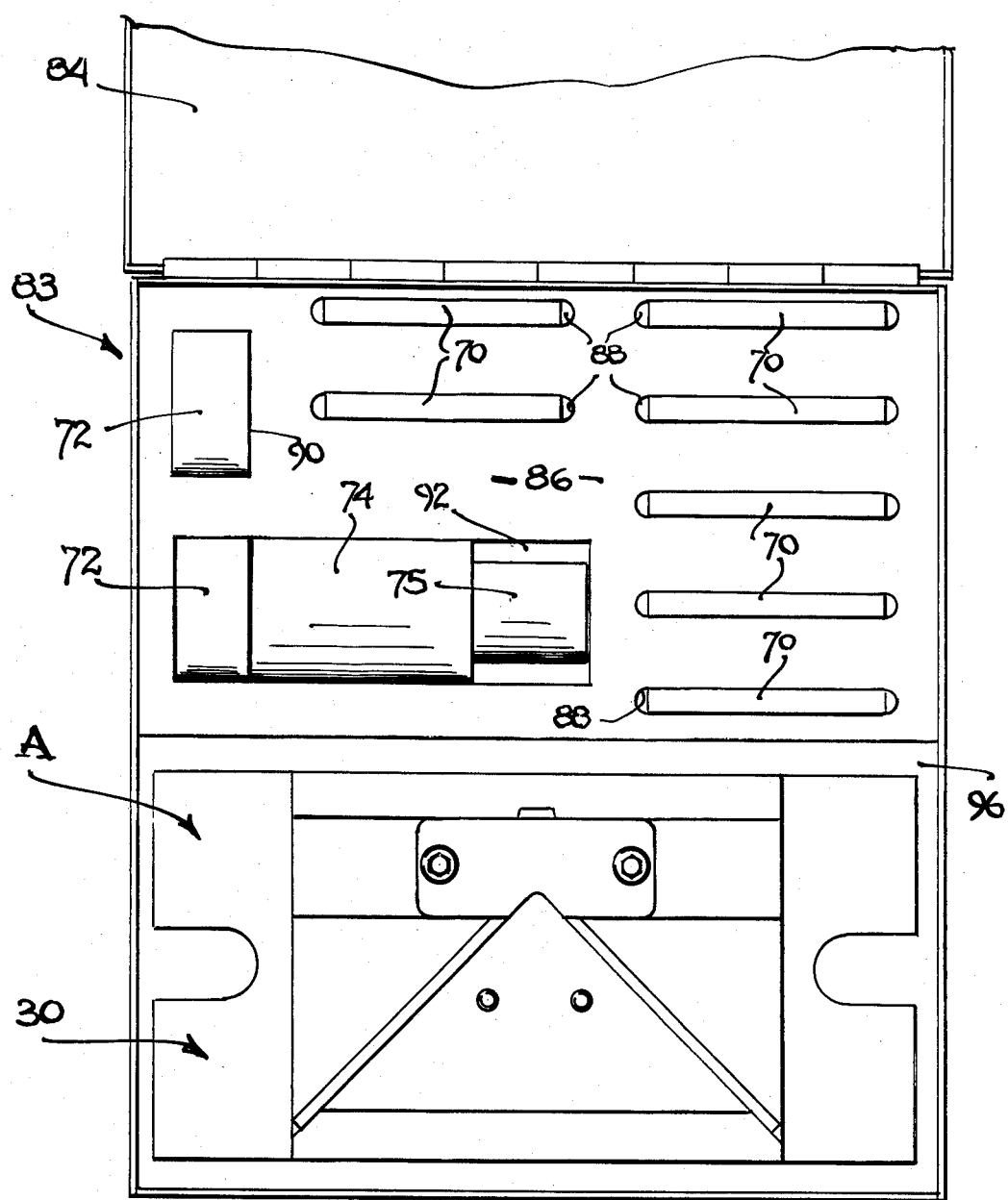
Figure 8:
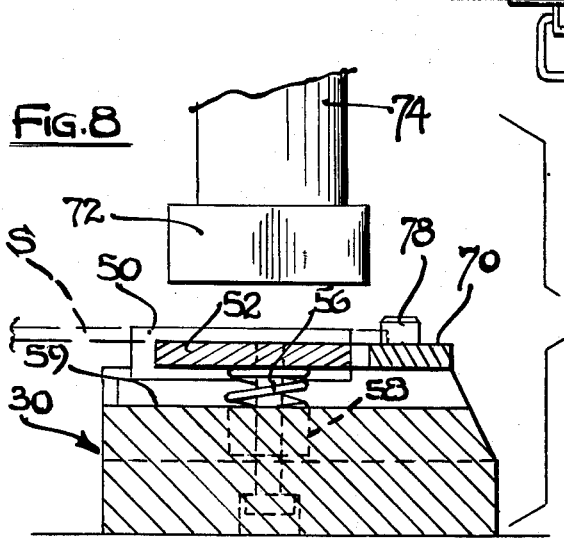

Having thus described the invention in general terms, reference will now be made to the accompanying drawings in which:

FIG. 1 is a fragmentary top plan view of a prior art apparatus used for forming a radius corner in a metal sheet;

FIG. 2 is a fragmentary side elevational view of the prior art apparatus of FIG. 1;

FIG. 3 is a perspective view of an apparatus for producing a radius corner on a sheet constructed in accordance with and embodying the present invention;

FIG. 4 is a top plan view of the apparatus of FIG. 3;

FIG. 5 is a front elevational view of the apparatus constructed in accordance with and embodying the present invention and showing the punch forming part of the apparatus attached to the ram of a conventional punch press;

FIG. 6 is a bottom plan view of one punch forming part of the apparatus of the invention, taken substantially along line 6—6 of FIG. 5;

FIG. 7 is a top plan view showing, partially in phantom lines, the cooperation of the punch and die set in the formation of a radius corner on a sheet with the apparatus of the present invention;

FIG. 8 is a fragmentary side elevational view, taken along line 8—8 of FIG. 7;

FIG. 9 is a bottom plan view, similar to FIG. 6, of another punch forming part of the apparatus of the present invention;

FIGS. 10 through 16 are top plan views of various die blocks which can be used in the apparatus of the present invention and similar to that die block shown attached to the apparatus in FIGS. 4, 7 and 8; and FIG. 17 is a top plan view of a portion of a container forming part of a kit forming part of the apparatus of the present invention.

DETAILED DESCRIPTION OF A PREFERRED EMBODIMENT

Referring now in more detail and by reference characters to the drawings, FIGS. 1 and 2 represent a prior art punch apparatus P for forming a radius corner in a metal sheet. The prior art apparatus P is generally a conventional punch press having a generally flat horizontally disposed receiving table 10 which removably retains a metal sheet 12 and which is held in relation to a pair of guide blocks 14. One edge of the sheet 10 is disposed on a die block 16 on or forming part of the table 10. A vertically shiftable punch 18 forming part of the punch press carries a punch head 20 at its lower end. When the punch 18 is shifted downwardly, the punch head 20 will engage the sheet 12 at the corner portion thereof and sever the corner portion from the sheet to thereby provide a radius corner.

In the conventional prior art punch press P, the die block may be rigidly secured to the supporting table 10 by means of bolts or other fasteners or it may be an integral part thereof. In either case, there was no facility to change the radius of the edge portion of the die block.

This prior art apparatus P is moderately effective in forming a radius corner of a specific radius on a sheet. However, in the conventional prior art apparatus P, there is no means for changing the radius of the corner portion which is produced. In order to alter the radius of the corner portion, it is necessary to use a different punch press P.

One of the major problems encountered with the conventional punch press, such as the punch press P is that there is no means to accurately position and hold the sheet 12 in relation to the punch 18 and the punch head 20. When the head 20 engages the sheet 12, there is a tendency to push the sheet 12 out of its fixed position in the guide blocks 14.

FIGS. 3-8 more fully illustrate one form of radius corner forming apparatus A constructed in accordance with and embodying the present invention. This radius corner forming apparatus A is designed to be used with a conventional punch press B, the latter of which is partially illustrated in FIGS. 5, 7 and 8 of the drawings. Inasmuch as the apparatus of the present invention is oftentimes used with a conventional punch press, the apparatus may also be considered as an adapter for an attachment to a conventional punch press in order to enable the use of the punch press to form radius corners of a large number of different radii in metal sheets.

The apparatus A of the present invention comprises a housing 30 preferably formed by machining or casting same from metal stock, such as steel, stainless steel, aluminum, or the like. The housing 30 is also provided on each of its transverse ends with a pair of integrally formed, outwardly extending mounting flanges 32 for securement to a horizontally disposed support surface 34 of a conventional punch press. The mounting flanges 32 are each provided with a slot 36 or other opening to receive a conventional fastener assembly, such as a bolt 38 and washer 40, in order to releasably secure the same to the supporting surface 34 of the punch press, as shown in FIG. 5.

Integrally formed with the housing 30 is an upwardly extending housing section 44 which is provided with a somewhat V-shaped, forwardly opening, recess or so-called "notch" 46. The housing 30 is also provided with an upper surface 48 which also partially serves as a sheet receiving surface, to receive a corner area of metal sheet S, as hereinafter described and in which a radius corner C is to be formed. The metal sheet S is shown in phantom lines in FIG. 8 and solid lines in FIG. 7. The V-shaped notch 46 is defined by a pair of vertically disposed guide walls 50 for guiding and positioning a metal sheet S in which a radius corner C is to be formed. These side walls 50 are essentially located at a right angle relative to one another, as best illustrated in FIGS. 3, 4 and 7 of the drawings.

By further reference to FIG. 7, it can be observed that the sheet S can be positioned with respect to the apparatus such that a pair of edges 51 of the sheet, which are also located at right angles relative to one another, can be engaged against and positioned by the vertically disposed guide walls 50. Furthermore, while the apparatus of the present invention is adapted to form radius corners on metal sheets, such as steel, aluminum, magnesium, etc., it should be understood that the apparatus can be used in order to form radius corners on other sheet shock material.

Located within the V-shaped notch or recess 46 is a sheet receiving plate 52 which is somewhat triangular in shape, as best illustrated in FIGS. 3 and 4 of the drawings. The sheet receiving plate 52 is resiliently mounted for vertically shiftable movement by means of a pair of vertically disposed support rods 54 and compression springs 56 which are concentrically disposed about the support rods or bolts 54. These compression springs 56, at their upper ends, bear against the underside of the sheet receiving plate 52, and at their lower ends are captured in cylindrically shaped recesses 58 formed in the housing portion which opens at the upper surface 59 which extends between the guide walls 50.

The shiftable rods 54 have enlarged heads 60 at their lower ends which are disposed within counter-bores 62 formed on the underside of the housing 30. Moreover, it can be observed that when the enlarged heads 60 engage the upper end of the bores 62, that position defines the uppermost limit of movement of the sheet supporting plate 52. The lowermost limit of movement is defined by the maximum compression of the springs 56, or otherwise, the engagement of the undersurface of the sheet receiving plate 52 with the upper surface 59.

The guide walls 50 integrally merge into a pair of rearwardly extending somewhat angulated walls 63 which together form a rearwardly located recess 64 which is an extension of the forwardly opening recess 46. A corner part of a sheet S may be disposed over the extension recess 64 and which corner part of the sheet S would normally project rearwardly beyond the corner portion of the sheet receiving plate 52, as shown in FIGS. 4 and 7.

In accordance with the above outlined constructions, it can be observed that during a radius corner forming operation, which is hereinafter described in more detail, a sheet S which is supported on the sheet receiving plate 52 will be resiliently retained on this sheet receiving plate and abutted against the guide walls 50. This construction has been found to be far superior in accurately forming a radius corner C on the sheet S without irregular edges and overcomes the previously encountered problem of lateral shifting movement of the sheet S during the radius corner forming operation.

Co-operating die blocks 70 and punches 72 are also used in the apparatus A of the present invention. In the embodiment of the invention as illustrated, eight such die blocks 70 are employed and two such punches 72 are employed. However, it should be understood that the number of punches and the number of die blocks could vary depending upon the desired number of corner radii which may be formed.

One of the punches 72 is shown attached to a punch support rod 74 and which is integrally provided with a diametrically reduced mounting end 75. This mounting end 75 is adapted for releasable securement to a collet (not shown) on the lower end of a shiftable ram (also not shown) of the conventional punch press B, in the manner as illustrated in FIGS. 5 and 7 of the drawings. It can be observed that the punch 72 can be releasably secured to the undersurface of the support rod 74, and hence to the punch press ram, by means of bolts 76, as shown in FIG. 6. In this way, the die 72 can be removed and replaced by the other die 72, as illustrated in FIG. 9.

The shiftable ram forms part of a punch press B, as indicated and the support rod 74 attached thereto together form part of a platen assembly (not shown) which is capable of vertically shifting the punch 72 with the requisite amount of pressure, generally by some form of hydraulic or mechanical system (not shown). To this extent, the punch press B is conventional in its construction and is therefore neither illustrated nor described in any further detail herein.

Any one of the die blocks 70 may be secured to the upper section 44 of the housing 30 by means of bolts 78. Furthermore, when so positioned, the die block 70 is disposed over the recess 64. Each of the various die blocks 70 which form part of the apparatus of the invention are more fully illustrated in FIGS. 10 through 16. One of the die blocks 70 is illustrated as being mounted on the apparatus A in FIGS. 3, 4 and 7. Each one of the die blocks 70 have a recess 80 formed along one of the edges thereof and each recess 80 has a different radius from any other such recess 80. The die block 70, illustrated as being attached to the apparatus in FIGS. 3, 4 and 7, would have a first radius $R_1$ and each of the other die blocks 70 would have radii $R_2$, $R_3$ ... $R_8$, as illustrated. Moreover, each die block 70 is provided with a pair of holes 82 on each of the opposite sides thereof in order to receive the bolts 78 for releasable securement to the housing 30. The radius $R_8$ is slightly larger than the radius $R_7$ and the radius $R_7$ is slightly larger than the radius $R_6$, etc., with the radius $R_1$ being the smallest of the radii.

Each of the punches 72, as illustrated in FIGS. 6 and 9, have four corners and each of the corners have a radius conforming to a radius of one of the die blocks 70. Thus, the punch 72, as illustrated in FIG. 6, and which is also shown as being mounted on the support rod 74, has a radius $R_1$ which corresponds to the radius $R_1$ of the die block 70 shown mounted to the apparatus A. The punch 72 also has a radius $R_2$ on another corner portion thereof corresponding to the recess with the radius $R_2$ of the die block 70 shown in FIG. 10, another corner portion having a radius $R_3$ conforming to the radius of the recess in the die block of FIG. 11 and a fourth corner portion with a radius $R_4$ conforming to the radius of the recess in the die block 70 illustrated in FIG. 12. In like manner, the die block of FIG. 9 has four additional radius corners which conform, respectively, to the recesses in each of the die blocks illustrated in FIGS. 13-16.

When it is desired to form a radius corner on a sheet, the user of the apparatus will merely select that desired radius in the punch 72 and in the die block 70. Thus, assuming for example, that it is desired to form a radius $R_2$, the user will position the corner having the radius $R_2$ of the punch 72 so that it is disposed over the recess 64 and so that it will engage the corner of the sheet disposed over the recess 64. In like manner, the user of the apparatus will select the die block 70 illustrated in FIG. 10 with the recess 80 positioned over that recess 64.

In operation, when the punch 72 carried by the support rod connection to the punch press ram is shifted downwardly, the corner portion of the punch with the selected radius will initially engage the sheet S. Inasmuch as the sharp corner edge of the sheet will extend under the die block 70, the punch 72 will sever that projected edge of the sheet in conformance with the radius, as for example, the radius $R_1$ formed by the recess of the die block 70 and the corner portion of the punch. Moreover, as the punch is shifted vertically downward, during the severing operation, the sheet receiving plate 52 will yield downwardly somewhat. This has a tendency to preclude the sheet from being pushed laterally outwardly and also aids in the formation of a very clean-cut radius corner with accurately reproducible results on each corner portion that is formed.

FIG. 17 illustrates an embodiment of the apparatus in the form of a kit in which the apparatus A as well as the various punches 72 and the die blocks 70 may be retained. In this case, the kit is in the form of a box 83 having a hingedly mounted cover 84. An insert 86 in the box has slots 88 to receive each one of the die blocks 70 and a separate recess 90 to receive one of the punches 72. Another recess 92 is designed to removably receive the punch support rod 74 and finally, an enlarged recess 96 is designed to receive the housing 30.

Thus, there has been illustrated and described a unique and novel device and method for forming any of a plurality of different radius corners on the edge of a sheet which thereby fulfills all of the objects and advantages which have been sought. It should be understood that many changes, modifications, variations, and other uses and applications will become apparent to those skilled in the art after considering this specification and the accompanying drawings. Therefore, any and all such changes, modifications, variations, and other uses and applications which do not depart from spirit and scope of the invention are deemed to be covered by the invention which is limited only by the following claims.

Having thus described my invention, what I desire to claim and secure by Letters Patent is:

1. Apparatus for producing a radius corner in a metal sheet and like sheet material, said apparatus comprising:
   (a) a plate having a relatively flat surface adapted to receive a sheet in which a corner portion is to be formed into a radius corner, said plate having a corner portion,
   (b) a die block co-operating with the corner portion of said plate and having a radius corner area substantially equivalent to the radius corner to be formed on the sheet and adapted to form the radius corner on the sheet, said die block having an upper surface to receive a corner portion of the sheet to be servered from the sheet,
   (c) a punch adapted to be attached to the lower end of a shiftable element of a punch press, said punch having a corner portion corresponding to the corner portion of the die block and where the corner portion of the punch engages the sheet at the radius corner area of the die block and cuts off the portion of the sheet to be severed from the sheet in a shearing action when the shiftable element is shifted thereby providing a radius corner on the sheet, and
   (d) means resiliently opposing a pressure of the shiftable element and punch when shifted and which means is connected to said plate to bias said plate in a direction opposite the movement of the punch when said punch moves toward said plate during the shearing action, said means opposing a pressure thereby resisting any substantial movement of said shiftable element and plate to thereby capture and hold said sheet to prevent lateral movement of said sheet during the shearing action.

2. The apparatus of claim 1 further characterized in that said generally vertically shiftable element is a ram of the punch press and said punch is attached to the generally vertically shiftable ram of the punch press.

3. The apparatus of claim 2 further characterized in that the means resiliently opposing the pressure of the punch is a biasing means which biases the plate upwardly against a downward movement of the punch and the ram.

4. The apparatus of claim 3 further characterized in that the means resiliently opposing is a plurality of compression springs.

5. The apparatus of claim 3 further characterized in that said punch is shifted downwardly to cut the corner portion of the sheet, and said means resiliently opposing biases said plate upwardly.

6. The apparatus of claim 1 further characterized in that first retainer means releasably holds said die block to said apparatus, and second retainer means releasably secures said punch to a punch press.

7. The apparatus of claim 6 further characterized in that a plurality of die blocks are provided and have differing arcuate radius corner areas of different radii and a plurality of punches are provided and each have different corner portions of different radii.

8. The apparatus of claim 7 further characterized in that an arcuate corner area of each die block matches an arcuate corner portion of one of the punches.

9. An apparatus for producing any one of a plurality of possible radius corners on a metal sheet or like material sheet, said apparatus comprising:
   (a) a shiftable plate adapted to receive on a flat surface thereof a sheet in which a radius corner is to be produced,
   (b) means resiliently supporting said plate so that said plate is capable of limited vertical movement during a shearing action, said means resiliently opposing being operative to bias said plate in a direction opposite that applied to the plate during a shearing action and which is sufficient to permit limited movement of said plate but resists substantial movement of said plate during a shearing action,
   (c) a die block located with respect to said shiftable plate and having an arcuate portion with a radius to be formed on a corner of a metal sheet, and
   (d) a punch adapted to be moved relative to said die block and having an arcuate corner portion with substantially the same radius of that arcuate portion in the die block such that when the punch is moved relative to the die block and engages a corner area of a sheet on the plate the punch will shear a portion of the sheet extending between the plate and the die block to form an arcuate corner portion thereon.

10. The apparatus of claim 9 further characterized in that the means resiliently supporting the plate is a plurality of compression springs.

11. The apparatus of claim 9 further characterized in that a wedge shaped guide forms part of such apparatus to guide a corner portion of a metal sheet to said die block.

12. The apparatus of claim 11 further characterized in that first retainer means releasably holds said die block to said apparatus and second retainer means releasably secures said punch to a punch press.

13. The apparatus of claim 12 further characterized in that a plurality of die blocks are provided and each have arcuate portions of different radius and a plurality of punches are provided and each have corner portions of different radius.

14. The apparatus of claim 13 further characterized in that an arcuate corner portion of each die block conforms to an arcuate portion of one of the punches.

15. The apparatus of claim 9 further characterized in that said appparatus comprises:
   (a) a plurality of punches, each of said punches being adapted to be attached to the shiftable member of a punch press assembly, each of said punches having an arcuate corner portion of a radius different from each other punch, and
   (b) a plurality of die blocks co-operable with the punches such that each die block can be located with respect to a shiftable punch and a piece of metal sheet to enable a cutting of a portion of the metal sheet to form a radius corner thereon, each of said die blocks having an arcuate portion of a radius different from each of the other die blocks, each of said die blocks also having that arcuate portion of a radius conforming to and essentially equal to that of a respective one of the punches.

16. The apparatus of claim 15 further characterized in that each punch is provided with a plurality of arcuate corner portions with each having a different radius and where the corner portion radius on each punch is different from the corner portion radius on each other punch, and each die block having an arcuate portion conforming to and essentially equal to that of a radius on a respective one of the punches.

17. The apparatus of claim 1 further characterized in that the means resiliently opposing a pressure also permits movement of said plate and a sheet thereon in the direction of movement of the punch during the shearing action, but resists any substantial movement of the plate and sheet during the shearing action.

* * * * *